Sept. 4, 1951 L. C. FRAZIER 2,567,064
METHOD OF MAKING TIRES
Original Filed Oct. 28, 1949
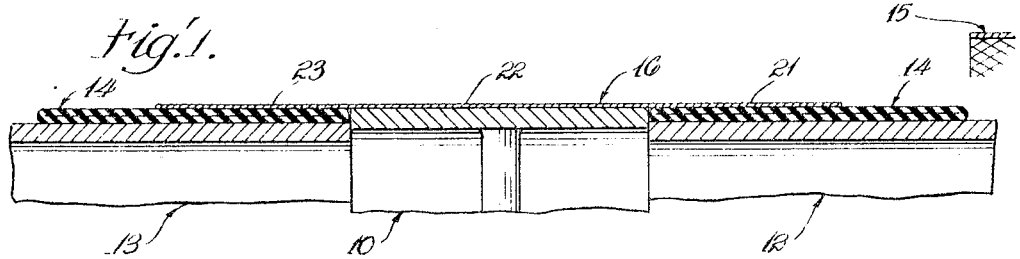
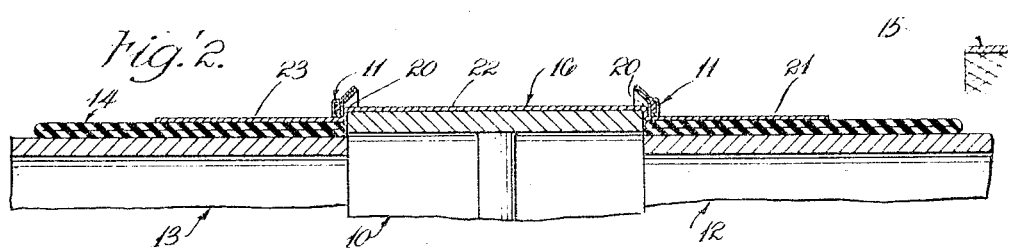
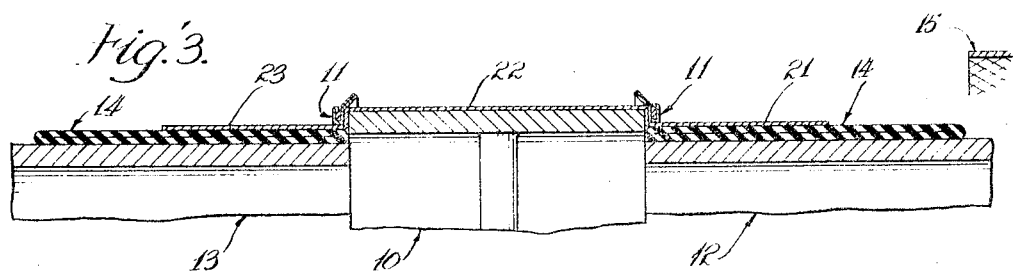
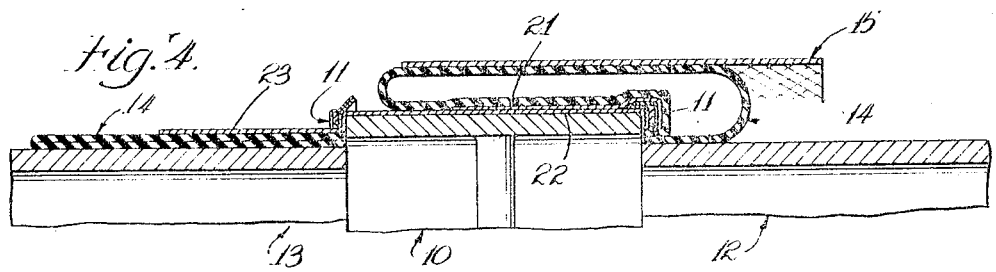
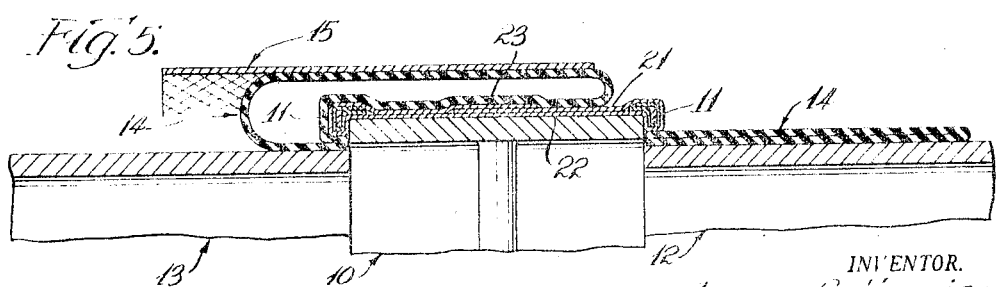
INVENTOR.
Larry C. Frazier Patented Sept. 4, 1951

2,567,064

UNITED STATES PATENT OFFICE 2,567,064

METHOD OF MAKING TIRES

Larry C. Frazier, Niles, Mich., assignor to National-Standard Company, Niles, Mich., a corporation of Michigan Original application October 28, 1949, Serial No. 124,225, now Patent No. 2,565,071, dated August 21, 1951. Divided and this application April 20, 1950, Serial No. 157,111

4 Claims. (Cl. 154—14)

My present application constitutes a division of my copending application Serial No. 124,225 filed October 28, 1949, Patent No. 2,565,071, dated August 21, 1951, and entitled Tire Building Machine, and is directed to the art of tire making.

More specifically my present invention is directed to the method of making a tire carcass as disclosed but not claimed in my above mentioned patent.

Briefly, my present invention contemplates the use of an expansible forming drum about which layers of tire fabric are laid, the forming drum being expanded to hold typical tire bead ring assemblies in position over the tire fabric and the tire fabric then laid outside inwardly over itself and enclosing the bead ring assemblies to create a novel and rapid method of constructing a tire carcass heretofore unknown in the art.

The main object of my invention is to disclose a new and improved method for fabricating a tire carcass.

Another object of my invention is to disclose a method of forming a tire carcass in which layers of tire fabric are wrapped around an expansible forming drum which is adapted to expand radially outward for holding a set of bead rings in place around the tire fabric by radial tension of the tire fabric.

Another important object of my invention is to teach a method of making a tire carcass in which an expansible forming drum is used to position and hold both the plies of tire fabric and the bead rings in predetermined relation so that suitable folding of the tire fabric over the bead rings and itself may ensue.

These and other objects and features of my invention will appear from time to time in the following detailed description. In order to acquaint those familiar and skilled with the forming art as to the mode of utilizing and accomplishing my process, reference is made to the accompanying drawings and to my above mentioned patent wherein a preferred type of machine readily adapted to carry out my process is disclosed in detail.

In the drawings:

Figure 1 is a schematic partial cross sectional front elevation of a forming mechanism as disclosed in my above mentioned patent showing a ply of tire fabric mounted on the expansible forming drum thereof;

Figure 2 is a schematic view similar to Figure 1 showing the initial expansion stage of the forming drum with the bead rings in their mounted position about the tire fabric and forming drum;

Figure 3 is a view similar to Figures 1 and 2 showing the forming drum in its extreme expanded position where the bead rings are anchored in place about the tire fabric;

Figure 4 is another schematic view similar to Figure 3 showing the initial outside inward folding of the tire fabric over one bead ring and itself by means of a cage member and expansible folding bags as described in connection with my patent of reference herein as stated above; and Figure 5 is still another schematic view, similar to Figure 4, showing the second folding operation of the tire fabric.

For clarity of understanding the detailed operations of the machine, which I shall refer to as an exemplary type for accomplishing the various steps of my process, attention is directed to my copending application Serial No. 124,225, and patent issued thereon referred to above, as supplementing the accompanying schematic drawings and the following descriptive matter.

Briefly, the machine disclosed in my copending application and patent thereon of reference herein contemplates a centrally located, expansible and collapsible main tire forming drum 10 on which the several operations of building a tire carcass by my process may be performed. While the drum is stationary during the tire building operations, it may be rotated sufficiently so as to stagger the area at which the splice of the tire fabric occurs in relation to the area of the splice in a typical tire tread member. The drum may be arched or flat as desired. Placement of bead ring assemblies 11 is permitted as well as the removal of the finished tire carcass by a shiftable tail stock member located at one end of the machine. Auxiliary drums 12 and 13, one of which is carried by the tail stock, flank either side of the main forming drum and lie coaxially therewith; the tail stock being adapted to swing arcuately out of alignment with the main tire building drum and also to move axially toward or away from the main tire building drum to permit the mounting of the bead ring assemblies 11 and the removal of the finished tire carcass. The main tire building forming drum is additionally flanked on either side by flat tubes or bags 14 made of rubber or similar material surrounding the auxiliary drums 12 and 13; the bags being expansible by pneumatic pressure or the like. The main forming drum is expansible and collapsible to three defined diameters, the smallest of which is equal to the diameter of the flat tubes or bags while in their collapsed condition as they lie flat around their respective auxiliary drums.

At one side of the main forming drum, as illustrated in Figure 1, is a large hollow cylinder or cage 15 which has a substantially greater inner diameter than the drum assembly. This cage telescopes over the drum assembly, stopping at various points thereon so that, in conjunction with the inflation and deflation of the bags 14 and the movement of the cage, tire fabric may be folded over the bead ring assemblies mounted on the main forming drum; the folding operation taking place in such a manner that the fabric is folded over the bead rings from opposite sides of the forming drum. The operation of the cage is automatically initiated and is responsive to pneumatic inflation of the forming bags. The detailed description of the various operational stages and the mechanism for actuating the above listed elements of this preferred type of machine is described in my application Serial No. 124,225 of reference herein.

Coming now to the detailed description of the several steps of my carcass forming process: as seen in Figure 1 a layer of tire fabric 16 is wrapped around a central forming drum 10 which is in its collapsed or smallest diameter condition; the fabric being of sufficient width so that its two lateral edges overreach the length of the forming drum and overlap the adjacent collapsed forming bags 14 on the auxiliary drums 12 and 13 as well. The amount to which the fabric extends over the bags 14 is determined by the desired breadth that the edges of the plies will overlap at the tread portion of the carcass when in their final folded position in the carcass. The type of tire fabric preferably employed is any of a number of known types utilized in the tire building industry and is usually a strip of biased-cut rubberized cord tire fabric or the like. As the ply of tire fabric is wrapped about the forming drum the edges of the ply will meet with a sufficient overlap to make a secure joint or junction and are then "stitched" together in a manner familiar in the tire building art. If desired, the application of the ply of tire fabric to the main forming drum 10 may be accomplished by means of machine or hand, but it is preferred that an applicator of a special type, not shown, which is the joint invention of this applicant and Florian J. Shook, for which application for patent is on file under Serial No. 128,186, filed November 18, 1949, now Patent No. 2,567,150, granted September 4, 1951, should be utilized. This applicator is additionally referred to and described in my application Serial No. 124,225 referred to above. If desired a plurality of tire fabric plies may be applied about the forming drum depending on the number of ply carcass which it is desired to form by my process.

After the tire fabric ply or plies are wrapped about the forming drum and spliced, the drum is partially expanded, as illustrated in Figure 2 of the drawings, so that the edges thereof form shoulders 20 against which tire bead assemblies 11 may be placed. These beads are in the usual ring form, containing wire reinforcement, such as used in straight side tires, and are wrapped with the usual flipper strips. Application of the tire bead rings may be by hand or by bead placing rings, not shown, which are described in detail in my copending application Serial No. 124,225 and patent thereon of reference herein. It will be noted that the bead rings are mounted one on either end of the central forming drum 10 in abutting relation against the shoulders 20 formed by the partial expansion of the forming drum. The beads are normally adhered to the rubberized surface of the tire fabric ply in a known manner. Placing of the annular bead rings about the drum assembly of course is accomplished by the removal of the tail stock, as explained above.

Upon the completion of the mounting of the bead rings as described above and illustrated in Figure 2, the main forming drum 10 is expanded to its outer limit, as illustrated in Figure 3, which draws the fabric tightly about the underside and inside of the bead rings. This operation is advisable to secure close adhesion of the fabric about the area adjacent the bead rings and serves to place the bead rings under radial tension due to the tendency of the fabric to straighten out or assume hypotenuse positions across depressions formed by the shoulders 20. The bead rings are now in a locked position preparatory to the folding operation of the tire fabric plies as will be described presently.

Figure 4 illustrates the initial folding operation of the tire fabric outside inwardly over itself and an adjacent bead ring 11. It will be seen that at one side of the machine, as illustrated in Figure 4, is the large hollow cylinder or cage 15 of substantially greater inner diameter than the drum assembly and mounted in a surrounding relation thereabout. The cage is adapted to move over the drums, stopping at various points therealong, so that, in conjunction with the inflation and deflation of the folding bags 14 and the movement of the cage, the fabric is folded over the beads from opposite sides to overlap the center portion intermediate the two bead rings.

The sequence of the folding operation, as illustrated in Figure 4, in folding a right hand portion 21 of the tire fabric plies over the adjacent bead ring 11 is as follows: The cage moves to the left over the auxiliary drum 12, the bag 14 on that drum now being inflated expanding the exposed marginal portion 21 of the ply radially outward against the inner surface of the cage and holding it in contact therewith under considerable pressure. The cage then continues to move to the left with controlled and steady movement over the main tire building drum 10; this latter operation of the cage serves to turn the tire fabric inside outwardly and fold the fabric over the bead 11 and as the movement of the cage continues causes the tire fabric plies to be pressed against the outer surface of the central area 22 of the tire fabric ply on the main tire building drum. The pull of the fabric as it is progressively folded over the based tightly wraps the fabric about the bead ring and presses it smooth with great force against the underlying portion of the fabric. The progressive steady movement of the cage and the tire fabric removes all air which might be entrapped between the plies thus eliminating air bubbles. This latter feature is a great improvement over older methods employed for stitching fabric plies and eliminates the operation of pricking the fabric to permit the escape of trapped air and removes any wrinkles which are incidents of hand operation and older practices of the tire building industry.

After the initial folding operation of the right hand marginal portion 21 of the tire fabric over the central portion 22 is completed, the cage stops and the pressure in the right hand folding bag 14 is automatically released. The tension in the bag, as soon as the internal pressure is released, causes the bag to resiliently fly back to its original deflated position surrounding the right hand auxiliary drum 12. The cage continues to move over the other or the left hand auxiliary drum 13 and finally stops preparatory to the folding of a left hand margin 23 of the tire fabric as illustrated in Figure 5.

As seen in Figure 5, the folding of the left hand marginal portion 23 of the tire fabric outside inwardly over itself and the left hand bead ring 11 so that it lies adjacent the central portion of the tire fabric and overlaps the previously folded right hand marginal portion 21, constitutes a repetition of the folding operation described above, but in the reverse direction. Of course, it will be understood that the left hand folding bag 14 serves to fold the left hand margin 23 during this second folding operation. Upon the final release of the pressure in the left hand folding bag 14 and its return to its surrounding position on the left hand auxiliary drum 13, the cage is returned to its initial extreme right hand position, as illustrated in Figure 3.

If desired, the carcass formed, as described above, may now be removed from the forming drum by the collapse of the drum 10 to its initial Figure 1 position and the removal of the tail stock. However, it has been found preferable to mount a conventional tread member around the carcass at this stage. It has ben found additionally preferable to press the tread to the carcass tire fabric by the use of the forming bags and the cage member as described above. This latter operation causes a powerful exertion of pressure on the tread to remove any air pocketed between the tread and the carcass and presses the tread firmly onto the carcass. The finished carcass with the tread is now ready for removal from the main forming drum and is ready for the usual bagging and vulcanizing steps.

Thus it may be seen that I have provided a new and useful forming process for the fabrication of pneumatic tire carcasses, or the like, comprising improved means for holding the retaining bead ring assemblies in position over the plied and overlapped tire fabric plies during the folding operation of the tire fabric so as to surround the bead rings to form a tire carcass.

While I have herein shown and described my new process in conjunction with, and as related specifically to, a particular machine disclosed by me in my prior copending application 124,225, filed October 28, 1949, and entitled Tire Building Machine and patent thereon, it will be readily understood that various changes, modifications, and substitutions of equivalents may be adopted without departing from the spirit and scope hereof and therefore, I do not which to be limited to the specific embodiment herein illustrated except as may appear in the following appended claims.

I claim:

1. The method of forming a pneumatic tire carcass on a cylindrical forming drum comprising the successive steps of wrapping a layer of tire fabric about said drum, said fabric extending beyond the opposite ends of said drum; securing said wrapped fabric into a substantially cylindrical form, expanding said forming drum and a central overlying portion of said fabric which is in contact therewith radially outward to hold a pair of concentrically mounted bead rings in spaced parallel relation thereabout, expanding said extending end portions of said tire fabric radially outward to a diameter greater than that of said expanded central portion, and successively folding each of said end portions in turn outside inwardly over itself, an adjacent bead ring and said central portion thereby to form a multiple ply tire carcass.

2. In the method of forming a pneumatic tire carcass on a radially expansible forming drum about which a plurality of tire fabric plies are wrapped and stitched to form concentric sleeves of tire fabric, the improved steps which include radially expanding said forming drum to an intermediate expanded diameter which results in the expansion therewith of a central overlying portion of said tire fabric sleeves to form shoulder portions therein adjacent opposite ends of said forming drum, mounting bead ring assemblies about said sleeves in adjacent abutting relation with each of said shoulders so formed, and further radially expanding said forming drum and said surrounding central portion of tire fabric so as to hold said bead rings in fixed spaced parallel relation preparatory to folding the unexpanded portions of said tire fabric sleeves outside inwardly over themselves and their adjacent bead ring assemblies.

3. The process of forming a tire carcass about a cylindrical forming drum wherein a plurality of tire fabric plies are concentrically wrapped about said drum so as to overlap the opposite ends thereof, a central longitudinal section of said fabric plies surrounding said drum is expanded radially outward with and by said drum to form locating shoulders for a pair of conventional tire bead ring assemblies, one of said tire bead rings is slipped over each unexpanded end portion of said tire fabric plies so as to abut said locating shoulders, said drum is expanded further radially so as to hold said bead ring assemblies in fixed spaced parallel relation under radial tension, said end portions of said tire fabric are expanded radially outward to a diameter greater than the second expanded diameter of said central section of said tire fabric, said expanded end portions then successively are folded outside inwardly over themselves and an adjacent bead ring assembly so as to overly said central section, and then said forming drum is collapsed radially inward whereby said carcass thus formed may be removed from said drum.

4. The method of constructing a pneumatic tire carcass on a radially expansible cylindrical forming drum comprising the steps of wrapping a ply of tire fabric about said forming drum so that opposite ends of said tire fabric overreach said drum's length, securing the longitudinal edges of said fabric together to form a lengthwise joint, partially expanding said forming drum radially outward so as to radially tension said fabric and cause the formation of shoulders therein adjacent the opposite ends of said forming drum, mounting conventional tire bead ring assemblies about said fabric and drum in adjacent abutting relation to each of said shoulders, further expanding said forming drum radially outward thereby to tension said fabric additionally which results in holding said bead ring assemblies in their mounted positions thereon, folding one end portion of said fabric, lying beyond one of said bead rings, outside inwardly over itself and said one bead ring so as to overlap said one bead ring and extend over a center portion of said tire fabric, lying between said two bead rings; folding the remaining corresponding end portion of said tire fabric outside inwardly over itself and the other bead rings so that said other end portion overlaps said other bead ring, said center portion and said previously folded one end portion; and collapsing said forming drum radially inward preparatory to removal of said carcass thus formed therefrom.

LARRY C. FRAZIER.

REFERENCES CITED

The following references are of record in the file of this patent:

UNITED STATES PATENTS

| Number | Name | Date |
|---|---|---|
| 1,832,478 | Desautels | Nov. 17, 1931 |
| 1,860,342 | Heston | May 24, 1932 |
| 2,145,806 | Schnedarek | Jan. 31, 1939 |
| 2,182,176 | Maranville | Dec. 5, 1939 |
| 2,440,662 | Frazier | Apr. 27, 1948 |
| 2,514,215 | Stevens et al. | July 4, 1950 |